Patented Feb. 24, 1942

2,274,252

UNITED STATES PATENT OFFICE 2,274,252

COMPOSITION

Arthur P. Tanberg, Wilmington, Del., assignor to E. I. du Pont de Nemours & Company, Wilmington, Del., a corporation of Delaware No Drawing. Application April 13, 1938, Serial No. 201,852

12 Claims. (Cl. 99—95)

This invention relates to novel compositions of matter and more particularly to dry compositions which when wet with water evolve gases. Specifically it relates to such compositions containing sulfamic acid.

This invention has as an object the preparation of dry stable compositions containing sulfamic acid and a material which reacts therewith, when water is added, to form a gas. A further object is the preparation of such compositions containing an additional material which is inert so far as the gas production reaction is concerned. A still further object is such compositions so prepared as to be useful as baking powders. A still further object is such compositions useful as plaster compositions. Other objects are such compositions useful in cements, ceramic ware, the inflation of life-saving belts, toy balloons and the like and in the production of gases, such as hydrogen, nitrogen, carbon dioxide, sulfur dioxide, hydrogen sulfide and the like. Still further objects appear hereinafter.

These objects are accomplished by the following invention wherein a dry stable composition is made by thoroughly mixing essentially dry sulfamic acid with an essentially dry material reactive therewith, when water is added, to produce a gas. Further dry solid materials which are inert in the gas producing reaction may also be present.

It has been found that sulfamic acid ($H_2N.SO_3H$) in dry, solid form may be mixed with dry salts or metals such as carbonates, nitrites, or magnesium metal, to form mixtures which remain comparatively inert in the dry state but which react readily upon the addition of water to liberate a gas such as carbon dioxide, nitrogen and hydrogen. The gas thus liberated may be used to swell and inflate compositions of various types, e. g., plaster, bread, baked goods, rubber articles, etc. When the inflating compositions enter into food or drink for human consumption, it must first be established that the particular combination involved is not toxic. Safety considerations require that only materials of proven freedom from harm should be employed.

The more detailed practice of the invention is illustrated by the following examples, wherein parts given are by weight unless otherwise stated. There are of course many forms of the invention other than these specific embodiments.

Example I

Baking powder

A baking powder composition was prepared by mixing 15 parts of dry sulfamic acid with 18 parts of corn starch, followed by the addition and mixing of 18 parts of dry sodium bicarbonate. When the mixture was added to water, carbon dioxide was rapidly evolved. This effect was also observed after six months storage, during which period the rate of gas evolution was negligible.

The dry composition was substituted for commercially available baking powder in the preparation of ordinary baking powder biscuits by well known baking procedures. The biscuits thus prepared had an excellent porous texture.

In the above example the starch may be replaced by other inert materials, e. g. farinaceous materials such as various types of starches, flour, or inert, edible powders.

Example II

Porous plaster A

A plaster composition was prepared comprising a dry mixture of 1 part sulfamic acid, 1 part sodium bicarbonate and 50 parts of gypsum plaster. This composition could be stored in ordinary paper cartons or bags for a prolonged period without appreciable change in physical form or chemical composition. Addition of 35 parts of water to the mixture and stirring the same produced a thick paste. This was placed in a mold and allowed to harden. The hardened article was found to have a highly porous structure, the volume being approximately twice that of a similar article prepared by adding 35 parts of water to 52 parts of gypsum.

In place of sodium bicarbonate in the above examples, other bicarbonates or carbonates which liberate carbon dioxide at greater or less rate such as potassium carbonate, potassium bicarbonate, calcium carbonate, etc., may be used.

Adhesives such as flour, starch, gelatin, glue, or water soluble resins, may be added to the above composition to improve the structure or strength of the plaster.

Example III

Gas-generating compositions

A dry mixture comprising 10 parts finely divided iron filings and 10 parts of sulfamic acid was found to evolve practically no hydrogen. However, upon slow addition of water (dropwise) a slow, consistent evolution of hydrogen could be obtained. Rapid addition of about 20 parts water gave a vigorous evolution of hydrogen until all of the acid had reacted with the excess iron present in the mixture.

In place of iron filings in the above example, other metals capable of displacing acidic hydrogen from sulfamic acid, i. e., metals above hydrogen in the electromotive series, may be used; such metals include magnesium, zinc, and aluminum. These compositions in powder form or compressed into pellets of suitable size and shape may be placed in various commercial and laboratory type gas generators which are used when contacts between liquids and solids are involved.

Example IV

Porous plaster B

To a dry plaster mixture comprising 1488 parts of gypsum plaster, 1.6 parts of urea, 7.4 parts of sodium nitrite and 5.2 parts of sulfamic acid was added with stirring and mixing 1120 parts of water. The plaster mass was then placed in a mold and allowed to solidify. After aging for three weeks the hardened plaster was removed from the mold. During the hardening process the plaster had acquired a structure containing a large number of extremely small pores while a similar article prepared from gypsum only was found to have a solid structure practically without pores. The latter article had a density of only 1.21 while that prepared from the above-given composition had a density of 1.00.

The dry plaster composition described above could be stored in cartons or paper bags for several months without appreciable change in its structure or chemical composition.

Example V

Base for effervescing solution

A dry mixture of 20 parts sodium bicarbonate and 10 parts of sulfamic acid was found to liberate only a trace of carbon dioxide upon standing. This mixture could be prepared and stored in dry condition for several months prior to its use in the preparation of effervescing solutions. When one-half teaspoon full of the mixture was added to an ordinary glass of cold water an effervescing solution was obtained while the solid composition was completely dissolved. The solution resembled ordinary carbonated water, i. e. water saturated with carbon dioxide.

In place of sodium bicarbonate in the above example, other soluble or less soluble bicarbonates or carbonates may be used. Sodium bicarbonate-sulfamic acid pellets may be used to carbonate liquids and, with excess bicarbonate, to alkalize the same. Lithium carbonate may be added to the pellet mixture.

Example VI

Foam composition

A composition comprising 44 parts of dry sawdust impregnated with 4.4 parts of sodium nitrite, 10 parts of wood flour, 5 parts of sulfamic acid and 1 part of technical sodium 9,10-octadecenyl sulfate, or related wetting agent was found to be practically inert and could be stored for a prolonged period of time. Upon the addition of about 140 parts of water to the mixture and stirring, a thick emulsion or foam was obtained. The stability of the foam-like mass was found to be largely dependent upon the amount of water added and the type and quality of the surface-active agent used. Such foam compositions were found to be especially useful an antidust agents for the sweeping of floors and as detergent mixtures for washing greasy hands, windows, floors, etc.

Other inert materials which can be included in the compositions of this invention include cork dust, ground cork, clays, carbon black, soya bean meal and the like. The particular inert material chosen will naturally depend on the purpose for which the composition is designed.

While in general the sulfamic acid and the gas producer are mixed in equivalent proportions, an excess of one or the other may at times be desirable. Thus in the preparation of effervescing solutions or of pellets, an excess of sodium bicarbonate may be used to advantage.

The present invention includes within its scope dry stable compositions of sulfamic acid with any material capable of reaction with the sulfamic acid when wet with water to form a gas but essentially unreactive therewith in the dry, solid, state. The material reacts more or less vigorously with the sulfamic acid in the presence of water depending on the solubility of the material in water although it may be practically insoluble in water, e. g. the finely divided metals of Example III above.

Among the materials suitable for mixture with the sulfamic acid to form the compositions are carbonates and bicarbonates which react with the sulfamic acid to form the corresponding sulfamate, carbon dioxide and water; nitrites which react to give a sulfate, nitrogen, and water; sulfites which react to give sulfamates, sulfur dioxide and water; sulfides, selenides, tellurides which react to give sulfamates and hydrogen sulfide, selenide, telluride; and metals above hydrogen in the electromotive series, which give sulfamates and hydrogen. Inasmuch as the alkali metal salts are in general soluble, these are in general preferred. Thus sodium and potassium carbonate, bicarbonate, nitrite, sulfite, bisulfite, metabisulfite, sulfide, polysulfide, selenide, telluride are generally employed. Other salts may be preferred on occasion, e. g. iron sulfide, calcium carbonate, barium sulfite. Because of the nature of the gases evolved, compositions employing sulfites, sulfides, selenides, and tellurides are less preferred embodiments of the invention.

All of these gas evolving materials are inorganic substances which react with concentrated hydrochloric acid to give a gas. Any such substance may be used. The majority are inorganic salts of weak acids which are gases or which decompose at ordinary or slightly elevated temperature, e. g. up to 100° C. to form gases.

The invention lies not so much in the reactions involved, as in the preparation of mixtures comprising solid sulfamic acid and the materials indicated, i. e., dry unreactive compositions. The advantages involved are discussed below.

The method of mixing the various ingredients present in the mixtures indicated is not important as long as a fairly uniform composition is obtained. The order in which the ingredients are mixed is, in general, not important although it is often desirable to mix all the ingredients except sulfamic acid first and then to add the acid just prior to completion of the mixing. This procedure allows the gas forming salt or metal to be more completely dispersed in the mixture before the addition of the acid, thereby lowering the possibility of intimate contact with the solid acid.

A material inert to the gas producing reaction may be incorporated in the sulfamic acid gas producing compositions. Any dry inert material, i. e. inert to the gas producing reaction, may be employed. The choice of such material is determined by the use to which the gas producing composition is to be put. Thus starch is used in the baking powder compositions, gypsum in the plaster compositions, and sawdust in antidust sweeping compounds.

Foam holders may be used in these inflating compositions, e. g., powdered egg albumen in baking powder compositions and compositions for effervescing solutions, powdered casein or other glue in plastic, sweeping compounds and the like.

In some cases it is desirable to coat the sulfamic acid crystals with an inert, water soluble, film forming material such as glue, gelatin, albumin, gum tragacanth, or natural or synthetic resins. This coating of crystals of sulfamic acid may be accomplished by drying crystals moistened with a solution of sulfamic acid containing the film forming material. The coated sulfamic acid crystals are entirely inert when used in the preparation of compositions such as are illustrated in the above examples. However, upon addition of water the soluble film is removed and the acid may then react in the manner desired. In general, the above coating treatment of sulfamic acid is not required since sulfamic acid is sufficiently non-hygroscopic, and inert in a dry form, to be so used for all ordinary purposes as illustrated.

In some cases the gas producing salt may be mixed with or impregnated into inert materials such as sawdust or wood flour, or the acid may be impregnated into the filler. In this way the slight tendency of certain very sensitive salts to react in solid form with sulfamic acid is almost entirely eliminated.

It has been found that sulfamic acid is especially suited for the preparation of unreactive dry compositions such as are capable of liberating gaseous products upon the addition of water. The various desirable qualities which favor the use of sulfamic acid for such purposes are (1) crystallinity, solid physical form, (2) non-hygroscopicity (3) high inertness in solid state, (4) ready solubility in water, with formation of highly ionized, highly acid aqueous solutions. Other solid acids which sometimes may be used such as oxalic, tartaric, citric, or benzoic acid, are deficient in one or more of the above qualities and therefore cannot be used to equal advantage. For example, an aqueous solution of sulfamic acid of unit normality (1 equivalent of acid hydrogen per liter of solution) shows a pH of 0.41 while solutions of tartaric, citric and oxalic acid at equivalent concentration show considerably less acidity with a pH ranging from about 0.80 to 2.5. A strong acidity is often desirable in order to secure a rapid and complete reaction upon addition of water. Solid acids which are only weakly ionized in solution and therefore are weakly acidic, are only slowly neutralized by carbonates. Hence such compositions upon addition of water liberate carbon dioxide slowly and remain acidic for a considerable period of time. This is often a serious disadvantage. On the other hand, a solid acid which is highly ionized and forms strongly acidic solutions will react rapidly and the solution will promptly reach a neutral point if a slight excess of the gas forming salt is used. If a slow evolution of gas is desired an excess of a gas forming salt having low solubility in water may be used. In the latter case the liberation of gas will be slow but uniform until all of the acid has reacted. The end of the reaction will also be more definite and abrupt. It is obvious that only solid acids can be used for the compositions described.

Sulfamic acid in the solid crystalline form contains no water of crystallization. Any reaction with solid salts such as sodium bicarbonate forms sodium sulfamate which serves as a dehydrating agent and absorbs the water formed by any such reaction. Hence, the dry solid composition does not become damp or moist because of any slight reaction of the sulfamic acid with the salts present in the composition. In contrast, certain other solid acids such as oxalic acid and citric acid, which might be employed in the preparation of certain such compositions, contain water of crystallization. Upon slight reaction of such acids with the salts present in the composition, this water of crystallization is released and, in addition, water is formed by the reaction. The corresponding salts do not serve as dehydrating agents or are not capable of absorbing the large amount of water released chemically and the reaction mixture soon becomes damp or moist. Such moist condition accelerates the reaction of the acid with the salts present and the composition therefore rapidly deteriorates even upon brief storage so that it can no longer be used for the intended purposes. This is especially important in baking powders or plaster compositions which are frequently stored for considerable time prior to their use.

Sulfamic acid may be conveniently and advantageously used for the preparation of the compositions indicated. These products may be used for a great variety of purposes such as imparting a porous structure to plasters, ceramic ware, cements, or baked goods, preparing effervescing solutions, inflating containers for gas made from fabrics, or rubber such as life saving belts, toy balloons, and the like, or for the production of carbon dioxide, nitrogen, hydrogen, sulfur dioxide, hydrogen sulfide, etc., for any purpose whatsoever. The use of pellets made from such compositions in gas generators for the production of hydrogen, nitrogen, carbon dioxide, sulfur dioxide, hydrogen sulfide, selenide or telluride is of advantage. The compositions of this invention which on treatment with water yield noncombustible gases may be used to extinguish fires, for which purpose they may be applied in a number of ways.

One suitable method is to use the dry stable sulfamic acid-gas liberating salt mixture as the dry charge in a soda-acid type fire extinguisher and replace the sulfuric acid charge by water. Another suitable method is to use the composition as dry charge desirably in conjunction with already incorporated foaming agents, such charge, in the form of powder or pellets, being dropped into water or sprayed with water to provide a foam blanket for use on small fires or in larger quantities even for use on oil fires. In connection with this use the dry composition may include a hydrated salt to furnish the necessary water, the powder being thrown directly on the fire. For this use, those salts which readily lose their water of crystallization at low temperatures, e. g., sodium carbonate decahydrate, sodium sulfate decahydrate, sodium thiosulfate pentahydrate, aluminum sulfate octokaidecahydrate, potassium alum, ammonium alum, etc., are preferred.

The foregoing detailed description has been given for clearness of understanding only and no unnecessary limitation should be understood therefrom.

I claim:
1. A dry stable solid composition comprising sulfamic acid and an inorganic salt soluble in acid solution with evolution of a gas.
2. A dry stable composition comprising sulfamic acid and an inorganic salt of the class consisting of carbonates, nitrites, sulfites, sulfides, selenides and tellurides.
3. A dry stable solid composition comprising sulfamic acid and a carbonate.

4. A dry stable solid composition comprising sulfamic acid, an inert finely divided solid and an inorganic salt soluble in acid solution with evolution of a gas.

5. A dry stable solid composition which is useful as a baking powder comprising sulfamic acid, a salt of carbonic acid and an inert farinaceous material.

6. A dry stable solid composition useful as a baking powder comprising sulfamic acid, starch and sodium bicarbonate.

7. Process which comprises bringing water in contact with the composition of claim 1.

8. A stable non-hygroscopic composition in a solid form adapted to produce carbon dioxide upon the addition of water consisting of an alkaline carbonate and sulfaminic acid.

9. A composition stable against deterioration in storage in the forms of cakes, tablets, powders, and other solid forms and adapted to produce carbonic acid gas upon the addition of water comprising sodium bicarbonate and sulfaminic acid.

10. A stable composition in powdered form for use in fire extinguishers delivering carbonic acid gas, and generating pressure upon coming in contact with the water of said fire extinguisher, comprising sodium bicarbonate and sulfaminic acid.

11. A stable composition in the form of crystals, powders, cakes and other solid forms suitable for use in compositions requiring the presence of effervescent mixtures comprising a carbonate soluble in acid solution and as an acid ingredient sulfaminic acid.

12. Process which comprises bringing water in contact with the composition of claim 2.

ARTHUR P. TANBERG.